(12) United States Patent
Ritter et al.

(10) Patent No.: US 8,689,119 B2
(45) Date of Patent: Apr. 1, 2014

(54) SEPARATION AND INTERLINKAGE OF UI MODEL AND SERVICE LAYER MODEL

(75) Inventors: Gerd M. Ritter, Heidelberg (DE); Tim Kornmann, Wiesloch (DE); Dirk Stumpf, Graben-Neudorf (DE); Jens Kisker, Heidelberg (DE); Ralf Philipp, Altlusheim (DE); Michael Meyringer, Rauenberg (DE); Rene Gross, Heidelberg (DE); Thomas Gauweiler, Speyer (DE)

(73) Assignee: SAP AG, Walldorf (DE)

( * ) Notice: Subject to any disclaimer, the term of this patent is extended or adjusted under 35 U.S.C. 154(b) by 251 days.

(21) Appl. No.: 13/194,164

(22) Filed: Jul. 29, 2011

(65) Prior Publication Data

US 2013/0031493 A1    Jan. 31, 2013

(51) Int. Cl.
*G06F 3/00* (2006.01)
*G06F 17/00* (2006.01)

(52) U.S. Cl.
USPC ............ 715/762; 715/763; 715/764; 707/760

(58) Field of Classification Search
USPC .................... 715/762–765; 707/760
See application file for complete search history.

(56) References Cited

U.S. PATENT DOCUMENTS

| | | | |
|---|---|---|---|
| 5,977,967 A * | 11/1999 | Berner et al. ................. | 715/826 |
| 6,363,393 B1 * | 3/2002 | Ribitzky ............................. | 1/1 |
| 6,609,123 B1 * | 8/2003 | Cazemier et al. ...................... | 1/1 |
| 6,789,252 B1 * | 9/2004 | Burke et al. .................. | 717/100 |
| 6,968,535 B2 * | 11/2005 | Stelting et al. ................. | 717/104 |
| 7,543,292 B2 * | 6/2009 | Haller et al. ................... | 718/100 |
| 7,774,463 B2 * | 8/2010 | Bloching et al. .............. | 709/225 |
| 7,895,226 B2 * | 2/2011 | Koch et al. .................... | 707/760 |
| 7,996,828 B2 * | 8/2011 | Massmann et al. ........... | 717/168 |
| 8,250,169 B2 * | 8/2012 | Beringer et al. .............. | 709/217 |
| 8,418,072 B1 * | 4/2013 | Bauer et al. ................... | 715/764 |
| 8,429,597 B2 * | 4/2013 | Prigge ........................... | 717/104 |
| 2006/0095332 A1 * | 5/2006 | Riemann et al. ................ | 705/22 |
| 2012/0166984 A1 * | 6/2012 | Brunswig et al. ............. | 715/765 |

* cited by examiner

*Primary Examiner* — Tadeese Hailu
(74) *Attorney, Agent, or Firm* — Buckley, Maschoff & Talwalker LLC

(57) ABSTRACT

A computer-implemented system may include reception, from a user interface client application, of a user interface request conforming to a user interface component model, translation of the user interface request from the user interface component model to a business object model, execution of interactions associated with the translated request with a backend service layer, the interactions conforming to the business object model, determination of business object node changes and business object property changes conforming to the business object model and corresponding to the interactions, translation of the business object node changes and the business object property changes to user interface data changes and user interface event property changes conforming to the user interface component model, and provision of the user interface data changes and user interface event property changes to the user interface client.

18 Claims, 6 Drawing Sheets

SEPARATION AND INTERLINKAGE OF UI MODEL AND SERVICE LAYER MODEL

FIELD

Some embodiments relate to enterprise services based on a business object model. More specifically, some embodiments relate to systems to facilitate the provision of enterprise services to user interface clients.

BACKGROUND

According to a service-oriented architecture, a backend service layer provides services (i.e., business functionality) to service consumers. FIG. 1 is a block diagram illustrating one such scenario. Typical service consumers use this business functionality to provide user interfaces, application-to-application or business-to-business integration, output management (e.g., printing), spreadsheet download, etc. Service consumers of different types, or even of a same type, may access the backend service layer in different ways. Therefore, the services are not particularly adapted to the requirements of any particular service consumer.

User interface client applications typically conform to a data model suited to implementation of a user interface. For example, a user interface implementation is typically concerned only with user interaction and exposure of data and events on the user interface. In contrast, little or no business logic needs to be executed at the client level.

However, even if the logic behind a user interface consists primarily of changing data or triggering events, the processing of a user interface request requires execution of particular steps in the backend service layer. The backend service layer exposes complex services to orchestrate underlying business logic and transaction handling. For example, each user interface request typically requires multiple service calls in the backend to execute steps, such as, but not limited to: modification of data; execution of actions; saving; coping with pending modifications; value help request processing; reacting on data changes; retrieving data; and retrieving properties.

Accordingly, conventional user interface client applications must adapt to services provided by the backend. This adaptation includes an adaptation to backend service layer terms, which are typically meaningless to a user interface developer. User interface terms are also mixed with backend service layer terms during processing of a user interface request in the backend. Mapping between the user interface terms and the backend service layer terms is complex, time consuming, and error prone, particularly if the linkages have to be manually searched over and over by a support technician in a debugger.

The main entities of a backend service layer are "business objects", which are software model representing real-world entities involved in business transactions. For example, a business object may represent a business document such as a sales order, a purchase order, or an invoice. A business object may also represent master data objects such as a product, a business partner, or a piece of equipment. Particular documents and master data objects (e.g., SalesOrder SO4711, ACME corporation) are represented by instances of their representing business object, or business object instances. Business objects expose their data in a complex, normalized data tree which consists of nodes containing attributes, actions (executing business logic on a node) and associations to other nodes.

A data retrieval service call is complex because it is organized alongside the complex business object tree and because it typically concerns multiple business objects. Since such calls occur often, their execution exhibits the greatest effect on system performance. The service layer and the underlying business objects provide a change notification mechanism in order to allow consumers to implement optimized data retrieval based upon data changes. This mechanism notifies consumers of which business object node instances were created, deleted or updated. Therefore, in case of changes, the consumers only retrieve the dedicated changes, and not the whole business object node tree.

However, for at least the foregoing reasons, it may be difficult for a service consumer to handle the retrieval of the business object node data, the corresponding data buffering and the reaction to any data change. In a case that data is changed and immediately retrieved after each change, not only is the data read multiple times, but the change notifications must be evaluated multiple times. If the aforementioned change notification handling is missing or too coarse, data changes may result in repeated reading of the whole data tree. Unnecessary data retrieval also may result from isolated reactions to change notifications or reading data without a defined order. This processing can result in "ping-pongs" between UI components during backend processing, which are hard to support/understand and entail a significant performance cost due to unnecessary service calls.

DETAILED DESCRIPTION

Figure 1:
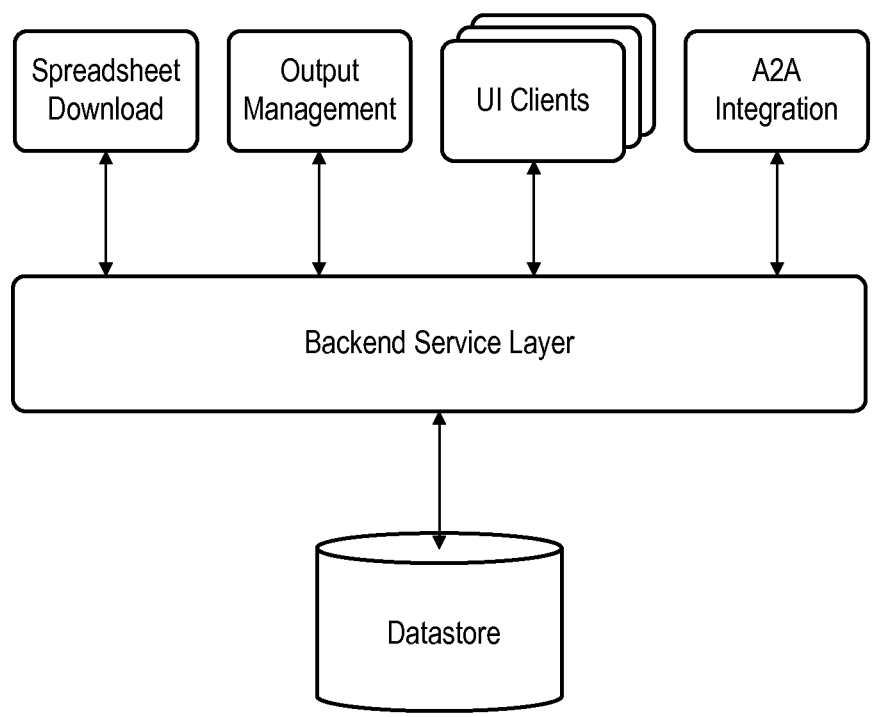
FIG. 1 is a block diagram of a system.
Figure 2:
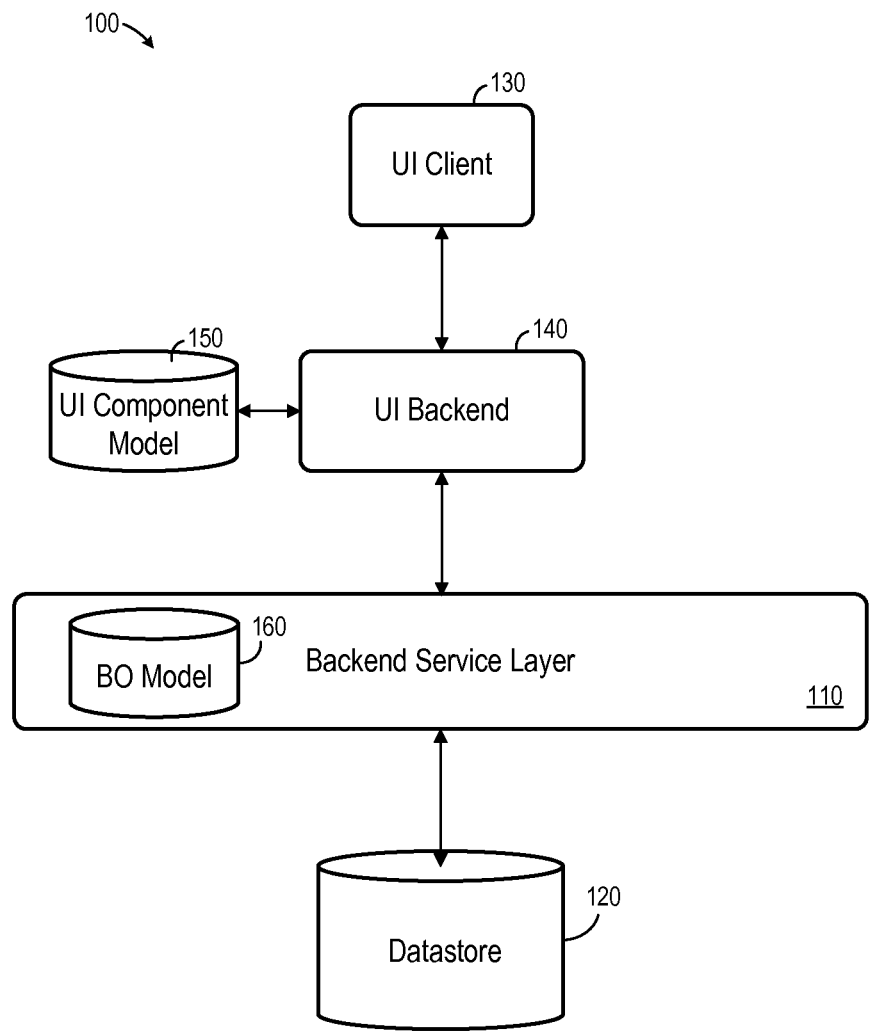
FIG. 2 is a block diagram of a system according to some embodiments.

FIG. 2 is a detailed block diagram of system 100 according to some embodiments. System 100 includes backend service layer 110, datastore 120, user interface (UI) client 130, and UI backend 140. Also shown are stores of metadata defining UI component model 150 and business object model 160. FIG. 2 represents a logical architecture for describing some embodiments, and actual implementations may include more or different components arranged in any manner. According to some embodiments, UI client 130 is located at a client or user site, while the other elements of system 100 are housed at a provider site, and may provide services to other UI clients located at the same or another user site.

Backend service layer 110 may comprise an enterprise services infrastructure and/or any implementation for providing services according to a service-oriented architecture paradigm. As described above, backend service layer 110 may provide services to one or more service consumers. The services are provided by executing processes conforming to business object model 160. According to the illustrated embodiment, the services may include retrieving, creating, modifying and/or deleting the data of business object instances stored in datastore 120. Datastore 120 may comprise any one or more systems to store business data. Such systems include, but are not limited to, relational database systems, Online Analytical Processing (OLAP) database systems, data warehouses, application servers, and flat files.

UI client 130 comprises an application implemented based on UI component model 150. For example, various UI elements provided by UI client 130, such as drop-down menus, trees, fact sheets, each conform to UI component model 150. That is, specific drop-down menus, etc. provided by UI client 130 are instances of their corresponding objects defined in UI component model 150.

UI backend 140 provides communication between UI client 130 and backend service layer 110. Generally, UI backend 140 receives a UI request which conforms to UI component model 150 from UI client 130, communicates with backend service layer 110 to fulfill the request, and provides a response which conforms to UI component model 150 to UI client 130. Operation of UI backend 140 according to some embodiments will be described in more detail below.

Figure 3:
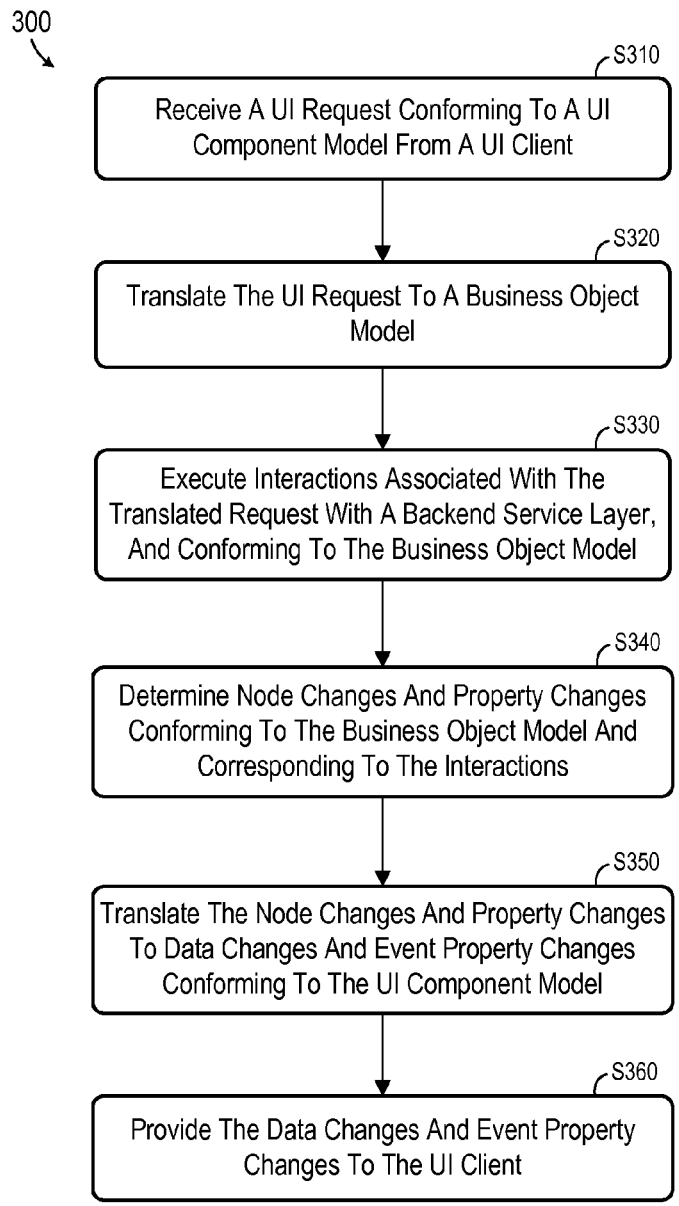
FIG. 3 is a flow diagram of process steps according to some embodiments.

FIG. 3 comprises flow diagram of process 300 according to some embodiments. In some embodiments, various hardware elements of an enterprise service provider execute program code to perform process 300. Examples of process 300 will be described below with respect to UI backend 140.

All processes mentioned herein may be embodied in computer-executable program code read from one or more of non-transitory computer-readable media, such as a floppy disk, a CD-ROM, a DVD-ROM, a Flash drive, and a magnetic tape, and then stored in a compressed, uncompiled and/or encrypted format. In some embodiments, hard-wired circuitry may be used in place of, or in combination with, program code for implementation of processes according to some embodiments. Embodiments are therefore not limited to any specific combination of hardware and software.

Initially, at S310, a UI request conforming to a user interface component model is received from a user interface client application. Referring to the FIG. 2 example, such a request may be received by UI backend 140 from UI client 130.

The user interface request may include one or more user interface events that were triggered (e.g., selection of a drop-down menu), and/or one or more user interface data changes (e.g., changing a value in a displayed field). The user interface events are either events of the user interface component model or system events of the user interface framework. Each of the one or more user interface events may include a respective event parameter, which may provides additional details on how to process the request.

Again, the user interface request conforms to the UI component model, in that the one or more user interface events and/or one or more user interface data changes are instances of events and data entities defined by the UI component model. These data entities defined by the UI component model may include fields, structures, and/or lists. Fields may represent single values or structured data (e.g., an amount including the amount value and the currency code value), and structures group several fields, substructures, or lists. Lists are the same as structures but may represent multiple instances of a structure, each of which is associated with a different row identifier.

Next, at S320, the user interface request is translated from the user interface component model to a business object model of the backend service layer (e.g., business object model 160). According to some embodiments, S320 includes identifying, for each modify request on a user interface data entity, a backend runtime representation of the user interface entity, and identifying a backend service sequence in the business object model (e.g., actions, save) corresponding to one of the one or more user interface events.

For purposes of the foregoing example, it will be assumed that the entire metadata model of a UI component, including both a UI component model part and the business object model part, is reflected in a corresponding shared object instance. This shared object instance is referred to as the metadata "load" of the UI component. The runtime data model is built based on the metadata load in a backend session once the UI component is initialized.

Each UI data entity is associated with an object instance representation in the backend service layer (e.g., an Advanced Business Application Programming object instance). The object instances are data containers and may offer few or no processing methods to translate from the UI component model to the business object model. These runtime instances points to the corresponding UI model entity in the metadata load of the shared object instance. In this regard, an object instance for each cell of a list column, for example, is not immediately created upon initialization in some embodiments. Rather, only a column object instance representing all cells of a column—is initially instantiated. Once a cell is actually required for processing a UI request, the cell object instance is initiated.

Events have no runtime object instance representation. Rather, the runtime model includes indices with event name and operation ID as a key. The index records point directly to the metadata information in the load corresponding to an event name and operation ID.

Figure 4:
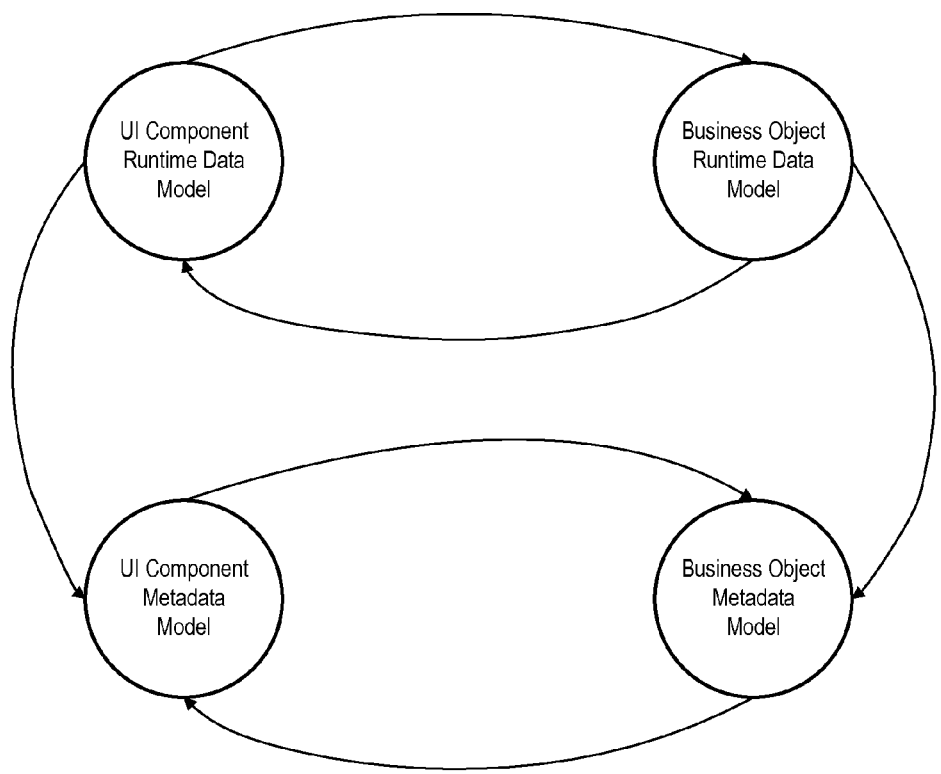
FIG. 4 is an illustration of model relationships according to some embodiments.

FIG. 4 summarizes the separation and the references between the UI component metadata model, the UI component runtime data model, the business object metadata model, and the business object runtime data model.

Data references are provided from the UI component model to the business object model and from the business object model to the UI component model. Those data references are added to the model entities during UI component initialization. Therefore, the "translation" from UI component model to business object model merely requires following data references in the runtime model.

Similarly, the UI component metadata model and the business object metadata model may be linked via data references to avoid data redundancy in the metadata load, which is typically stored in shared memory on the backend for performance reasons. Moreover, such references facilitate location of corresponding information without performance loss. As also illustrated in FIG. 4, the runtime entities of both the UI component model and the business object model refer to their metadata counterparts.

By virtue of the above-described referencing, table reads in coding may be avoided. Therefore, the performance overhead of the request translation and described metadata retrieval is negligible.

Returning to FIG. 3, interactions associated with the translated request are executed with the backend service layer. The interactions conform to the business object model of the backend service layer. These interactions may be executed by UI backend 140 in conjunction with backend service layer 110. For example, these interactions may include modifies, actions, save, retrieve, etc., each of which references entities of the business object model based on the translated request.

Node changes and property changes conforming to the business object model are determined at S340. These changes correspond to (i.e., at least partially result from) the interactions executed at S330.

In one example of S340, it is assumed that a UI component includes an embedded address UI component. The address details depend on the selected party and its address in the "parent" UI component. Once a new party is selected and the address changes, then the address details in the embedded UI component also have to be updated. Therefore, once the corresponding business object nodes of the surrounding UI component are updated, the backend service layer returns a change notification related to the underlying address details (e.g., invalidation of association). This change notification can be then used to retrieve all the changed nodes and properties in one step.

Generally, to avoid multiple roundtrips between UI backend 140 and backend service layer 110, S330 may include execution of all changes (e.g., data changes, action calls or save calls). Next, after all the changes have been effected in backend service layer 110 (i.e., no more changes are expected based on the executed interactions), change notifications are collected and condensed (e.g., remove duplicates, negations (create+delete)), and the changed data is read based on the change notifications at S340. In other words, if several modifies, save and action calls are executed based on one UI request, data is only read once and not after each change service call.

As a further optimization of S340, changed business object data may be handled on a node basis based on the node hierarchy of the business object. For example, for each main business object node being used in a UI component, a corresponding business object node implementation exists in the runtime. This implementation is responsible for executing changes on a node but also for retrieving the node data based upon the resulting change notifications or based upon explicit client read requests. As a result, nodes may be categorized into types, with different implementations provided for each of the types. For example, a structure node implementation may exist for 0 . . . 1 cardinality nodes and list node implementations (e.g., simple list, Sortable & Pageable List, Hierarchical List) may exist for 0 . . . n cardinality nodes.

By handling business object data changes on basis of the backend business object model and not on basis of the UI component model data, data may be retrieved in the same granularity of the notified changes. Also, even if multiple UI data entities are bound to one business object node, the instance of the business object node will be read only once.

Also, when retrieving data based on the change notification, at least one node in the hierarchy is the starting point to read and any child node instance gets read relative to it "from the top down". For example, the root node shall be read for a specific key then the child nodes are retrieved based upon this key. In case of sub-nodes of list nodes, the retrieval of these sub-nodes is based upon the loading type configuration in the UI component model such that: 1) In the case of standard loading for all list instances, the corresponding sub-node tree will be read; or 2) in the case of "lazy" loading only the sub-node hierarchy instances for the lists lead selection will be read.

Next, at S350, the determined node changes and property changes, which have been retrieved based on the node change and property change notifications, are translated to data changes and event property changes of corresponding UI data entities of the UI component model. This translation may occur for each UI component separately. For each business object node change, a corresponding user interface data delta and a corresponding user interface event property delta is determined for each user interface data entity associated with the changed business object node. For each business object node property change, the events are bound to node ACTION properties and the property "UI event enabled" is determined.

Finally, at S360, the data changes and event property changes, which conform to the UI component model, are provided to the UI client. In this regard, UI backend 140 is aware of the data that has been previously accessed and sent to UI client 130. Accordingly, UI backend 140 need only provide data changes and property changes to UI client 130 (i.e., delta protocol).

By virtue of the foregoing, some implementations of UI client 130 need not adapt to terms, data structures or services of backend service layer 110. Development of UI client 130 may occur entirely within the UI component model, while UI client 130 is "shielded" from the terms and complexity of backend service layer 110.

By executing required interactions based on a UI request, waiting for interactions to take effect, reading resulting change notifications and then reading data/properties based on all the change notifications, some embodiments provide increased performance and decreased development and support complexity.

Figure 5:
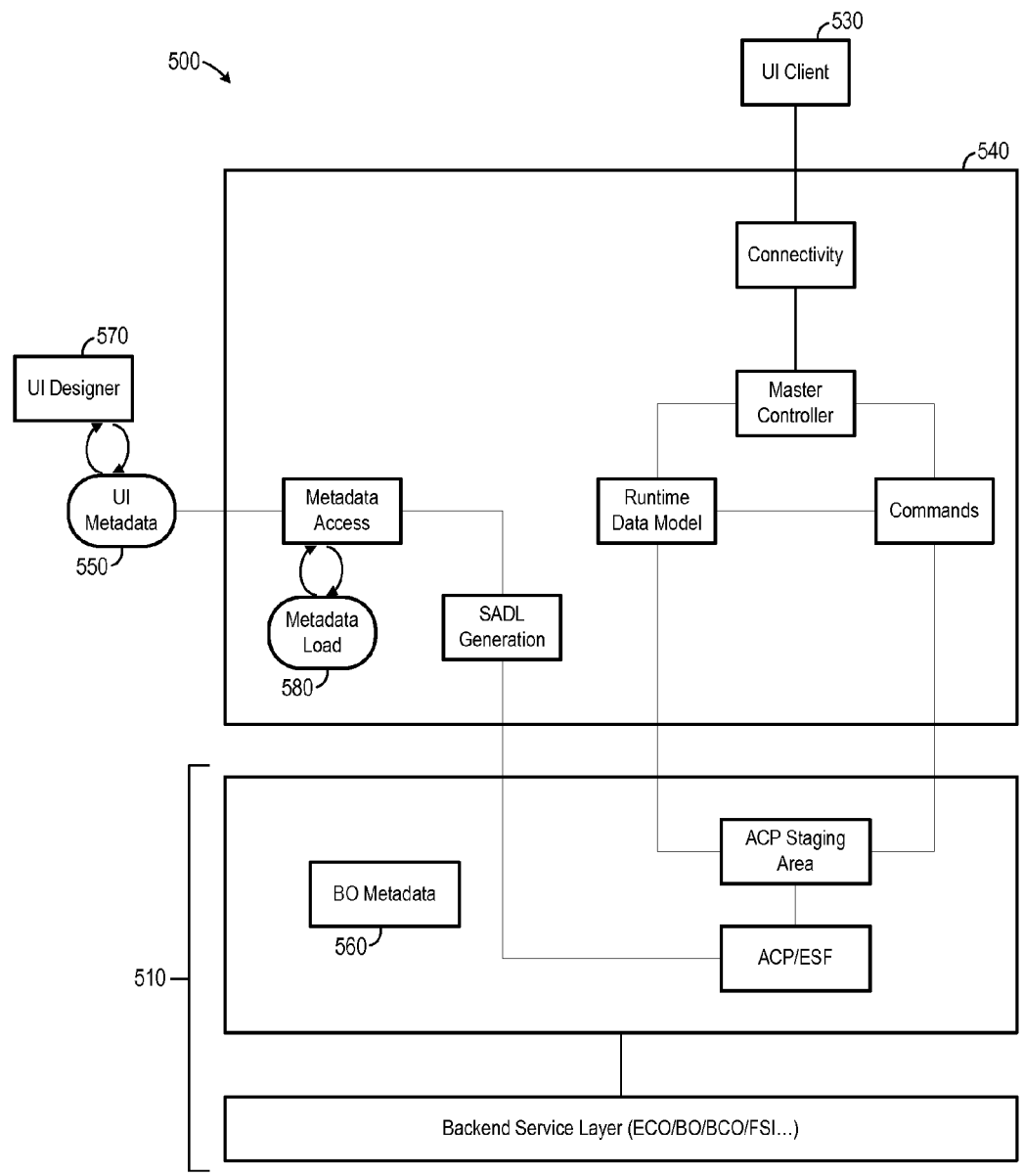
FIG. 5 is a detailed block diagram of a system according to some embodiments.

FIG. 5 is a block diagram of an implementation of system 100 according to some embodiments. Each numbered element of system 500 represents an implementation of a correspondingly-numbered element of system 100.

System 500 illustrates both design time and runtime aspects of the embodiments described herein. For example, UI designer 570 may build UI metadata 550 which conforms to a UI component model design, and which is used and evaluated by UI client 530. Moreover, as described above, metadata load 580 is generated at runtime based on UI metadata 550 and business object metadata 560.

Figure 6:
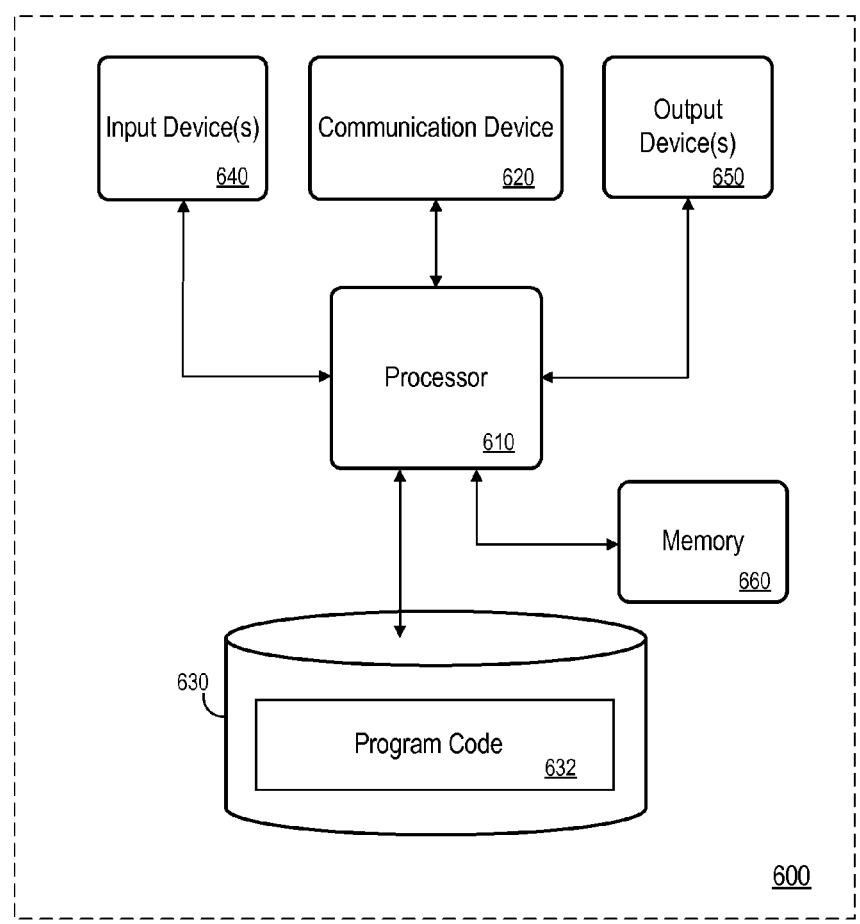
FIG. 6 is a block diagram of a computing device system according to some embodiments.

FIG. 6 is a block diagram of apparatus 600 according to some embodiments. Apparatus 600 may comprise a general-purpose computing apparatus and may execute program code to perform any of the functions described herein. Apparatus 600 may comprise an implementation of UI backend 140. Apparatus 600 may include other unshown elements according to some embodiments.

Apparatus 600 includes processor 610 operatively coupled to communication device 620, data storage device 630, one or more input devices 640, one or more output devices 650 and memory 660. Communication device 620 may facilitate communication with external devices, such as a reporting client, or a data storage device. Input device(s) 640 may comprise, for example, a keyboard, a keypad, a mouse or other pointing device, a microphone, knob or a switch, an infra-red (IR) port, a docking station, and/or a touch screen. Input device(s) 640 may be used, for example, to enter information into apparatus 600. Output device(s) 650 may comprise, for example, a display (e.g., a display screen) a speaker, and/or a printer.

Data storage device 630 may comprise any appropriate persistent storage device, including combinations of magnetic storage devices (e.g., magnetic tape, hard disk drives and flash memory), optical storage devices, Read Only Memory (ROM) devices, etc., while memory 660 may comprise Random Access Memory (RAM).

Program code 632 may be executed by processor 610 to cause apparatus 600 to perform any one or more of the processes described herein. Embodiments are not limited to execution of these processes by a single apparatus. Data storage device 630 may also store data and other program code for providing additional functionality and/or which are necessary for operation thereof, such as device drivers, operating system files, etc.

The foregoing diagrams represent logical architectures for describing processes according to some embodiments, and actual implementations may include more or different components arranged in other manners. Other topologies may be used in conjunction with other embodiments. Moreover, each system described herein may be implemented by any number of devices in communication via any number of other public and/or private networks. Two or more of such computing devices may be located remote from one another and may communicate with one another via any known manner of network(s) and/or a dedicated connection. Each device may comprise any number of hardware and/or software elements suitable to provide the functions described herein as well as any other functions. For example, any computing device used in an implementation of system 100 may include a processor to execute program code such that the computing device operates as described herein.

All systems and processes discussed herein may be embodied in program code stored on one or more computer-readable media. Such media may include, for example, a floppy disk, a CD-ROM, a DVD-ROM, a Flash drive, magnetic tape, and solid state Random Access Memory (RAM) or Read Only Memory (ROM) storage units. Embodiments are therefore not limited to any specific combination of hardware and software.

Elements described herein as communicating with one another are directly or indirectly capable of communicating over any number of different systems for transferring data, including but not limited to shared memory communication, a local area network, a wide area network, a telephone network, a cellular network, a fiber-optic network, a satellite network, an infrared network, a radio frequency network, and any other type of network that may be used to transmit information between devices. Moreover, communication between systems may proceed over any one or more transmission protocols that are or become known, such as Asynchronous Transfer Mode (ATM), Internet Protocol (IP), Hypertext Transfer Protocol (HTTP) and Wireless Application Protocol (WAP).

The embodiments described herein are solely for the purpose of illustration. Those in the art will recognize other embodiments may be practiced with modifications and alterations limited only by the claims.

What is claimed is:

1. A computer-implemented method comprising:
receiving, from a user interface client application, a user interface request conforming to a user interface component model;
translating the user interface request from the user interface component model to a business object model;
executing interactions associated with the translated request with a backend service layer, the interactions conforming to the business object model;
determining business object node changes and business object property changes conforming to the business object model and corresponding to the interactions;
translating the business object node changes and the business object property changes to user interface data changes and user interface event property changes conforming to the user interface component model; and
providing the user interface data changes and user interface event property changes to the user interface client;
wherein the user interface request comprises:
one or more user interface events, each of the one or more user interface events comprising a respective event parameter; and
one or more user interface data changes; and
wherein the one or more user interface events in the user interface request and the one or more user interface data changes in the user interface request occur prior to the receiving the user interface request.

2. A computer-implemented method according to claim 1, wherein the user interface component model comprises user interface data entities and user interface events, and wherein the user interface data entities comprise fields, structures, and lists.

3. A computer-implemented method according to claim 1, wherein translating the user interface request comprises:
identifying a backend runtime representation in a business object runtime data model of a user interface entity corresponding to one of the one or more user interface data changes; and
identifying a backend service sequence in the business object runtime data model corresponding to one of the one or more user interface events.

4. A computer-implemented method according to claim 3, wherein the user interface component runtime data model of the user interface entity includes a pointer to the identified backend runtime representation in the business object runtime data model,
wherein the identified backend runtime representation comprises a pointer to the backend representation in the business object metadata model,
wherein the backend representation in the business object metadata model comprises a pointer to a representation of the user interface entity in the user interface component metadata model, and
wherein the user interface component runtime data model comprises a pointer to the representation of the user interface entity in the user interface component metadata model.

5. A computer-implemented method according to claim 3, wherein translating the business object node changes and the business object property changes comprises:
for each business object node change, determining a corresponding user interface data delta and a corresponding user interface event property delta for each user interface data entity associated with the changed business object node.

6. A computer-implemented method according to claim 1, wherein the user interface data changes and the user interface event property changes comprise delta information.

7. A non-transitory computer-readable medium storing program code executable by a computing system, the program code comprising:
code to receive, from a user interface client application, a user interface request conforming to a user interface component model;
code to translate the user interface request from the user interface component model to a business object model;
code to execute interactions associated with the translated request with a backend service layer, the interactions conforming to the business object model;
code to determine business object node changes and business object property changes conforming to the business object model and corresponding to the interactions;
code to translate the business object node changes and the business object property changes to user interface data changes and user interface event property changes conforming to the user interface component model; and
code to provide the user interface data changes and user interface event property changes to the user interface client;
wherein the user interface request comprises:
one or more user interface events, each of the one or more user interface events comprising a respective event parameter; and
one or more user interface data changes; and
wherein the one or more user interface events in the user interface request and the one or more user interface data changes in the user interface request occur prior to the receive the user interface request.

8. A medium according to claim 7,
wherein the user interface component model comprises user interface data entities and user interface events, and
wherein the user interface data entities comprise fields, structures, and lists.

9. A medium according to claim 7,
wherein the code to translate the user interface request comprises:
code to identify a backend runtime representation in a business object runtime data model of a user interface entity corresponding to one of the one or more user interface data changes; and
code to identify a backend service sequence in the business object runtime data model corresponding to one of the one or more user interface events.

10. A medium according to claim 9,
wherein the user interface component runtime data model of the user interface entity includes a pointer to the identified backend runtime representation in the business object runtime data model,
wherein the identified backend runtime representation comprises a pointer to the backend representation in the business object metadata model,
wherein the backend representation in the business object metadata model comprises a pointer to a representation of the user interface entity in the user interface component metadata model, and
wherein the user interface component runtime data model comprises a pointer to the representation of the user interface entity in the user interface component metadata model.

11. A medium according to claim 9,
wherein the code to translate the business object node changes and the business object property changes comprises:
code to determine, for each business object node change, a corresponding user interface data delta and a corresponding user interface event property delta for each user interface data entity associated with the changed business object node.

12. A medium according to claim 7,
wherein the user interface data changes and the user interface event property changes comprise delta information.

13. A computing system comprising:
a memory storing processor-executable process steps; and
a processor to execute the processor-executable process steps to cause the system to:
receive, from a user interface client application, a user interface request conforming to a user interface component model;
translate the user interface request from the user interface component model to a business object model;
execute interactions associated with the translated request with a backend service layer, the interactions conforming to the business object model;
determine business object node changes and business object property changes conforming to the business object model and corresponding to the interactions;
translate the business object node changes and the business object property changes to user interface data changes and user interface event property changes conforming to the user interface component model; and
provide the user interface data changes and user interface event property changes to the user interface client;
wherein the user interface request comprises:
one or more user interface events, each of the one or more user interface events comprising a respective event parameter; and
one or more user interface data changes; and
wherein the one or more user interface events in the user interface request and the one or more user interface data changes in the user interface request occur prior to the receive the user interface request.

14. A system according to claim 13,
wherein the user interface component model comprises user interface data entities and user interface events, and
wherein the user interface data entities comprise fields, structures, and lists.

15. A system according to claim 13,
wherein translation of the user interface request comprises:
identification of a backend runtime representation in a business object runtime data model of a user interface entity corresponding to one of the one or more user interface data changes; and
identification of a backend service sequence in the business object runtime data model corresponding to one of the one or more user interface events.

16. A system according to claim 15,
wherein the user interface component runtime data model of the user interface entity includes a pointer to the identified backend runtime representation in the business object runtime data model,
wherein the identified backend runtime representation comprises a pointer to the backend representation in the business object metadata model,
wherein the backend representation in the business object metadata model comprises a pointer to a representation of the user interface entity in the user interface component metadata model, and
wherein the user interface component runtime data model comprises a pointer to the representation of the user interface entity in the user interface component metadata model.

17. A system according to claim 15,
wherein translation of the business object node changes and the business object property changes comprises:
determination, for each business object node change, of a corresponding user interface data delta and a corresponding user interface event property delta for each user interface data entity associated with the changed business object node.

18. A system according to claim 13,
wherein the user interface data changes and the user interface event property changes comprise delta information.

* * * * *